(12) United States Patent
Lehman

(10) Patent No.: US 11,568,613 B2
(45) Date of Patent: *Jan. 31, 2023

(54) APPARATUS, SYSTEM, AND METHOD OF PROVIDING A THREE DIMENSIONAL VIRTUAL LOCAL PRESENCE

(71) Applicant: Josh Lehman, Las Vegas, NV (US)

(72) Inventor: Josh Lehman, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/385,664

(22) Filed: Jul. 26, 2021

(65) Prior Publication Data

US 2022/0020220 A1 Jan. 20, 2022

Related U.S. Application Data

(63) Continuation of application No. 16/924,323, filed on Jul. 9, 2020, now Pat. No. 11,074,759.

(60) Provisional application No. 62/872,035, filed on Jul. 9, 2019.

(51) Int. Cl.
| | | |
|---|---|---|
| *G06T 15/00* | (2011.01) | |
| *G06T 19/00* | (2011.01) | |
| *G06T 19/20* | (2011.01) | |
| *G06T 7/20* | (2017.01) | |
| *H04N 9/75* | (2006.01) | |

(52) U.S. Cl.
CPC .............. *G06T 19/006* (2013.01); *G06T 7/20* (2013.01); *G06T 19/20* (2013.01); *G06T 2219/2004* (2013.01); *H04N 9/75* (2013.01)

(58) Field of Classification Search
CPC ......... G06T 19/006; G06T 19/20; G06T 7/20; G06T 2219/2004; H04N 9/75
See application file for complete search history.

(56) References Cited

U.S. PATENT DOCUMENTS

| | | | |
|---|---|---|---|
| 10,602,117 B1* | 3/2020 | Côté | G09B 19/24 |
| 2015/0348326 A1* | 12/2015 | Sanders | H04N 5/275 |
| | | | 345/633 |
| 2019/0066378 A1* | 2/2019 | Sheftel | H04N 7/157 |
| 2019/0179405 A1* | 6/2019 | Sun | G06F 1/1686 |

\* cited by examiner

*Primary Examiner* — Charles Tseng
(74) *Attorney, Agent, or Firm* — Thomas J. McWilliams; Barnes & Thornburg LLP

(57) ABSTRACT

A virtual local presence display apparatus, system and method is disclosed. Included are an extraction engine capable of automatically disassociating the virtual local presence from its production background; a first data feed of an actual background in which the displaying device resides; a background data feed of a plurality of optional backgrounds including at least the production background of the virtual local presence; a stream subject data feed of an extracted one of the virtual local presence extracted from the production background; an integrated data feed in which the virtual local presence and a background are integrated; a first processing having a receiver capable of receiving the data feeds and assessing a plurality of focal lengths to focal planes for the virtual presence in the production background, and in a selected one of the other backgrounds; and a second processing for causing displaying, on the display device, the virtual presence at a suitable location with regard to the focal planes in a selected one of the other backgrounds.

18 Claims, 17 Drawing Sheets

```
public static void ChromaKeyAlphaBlit(Texture2D input, RenderTexture output, Color color, float
range, float hueRange, float opacity = 1.0f, float edgeSharpness = 20.0f)
{
    ChromaKeyAlphaBlit(input, output, color, range, hueRange, opacity , edgeSharpness,
Vector2.zero, Vector2.one, false, false, Vector4.zero);
}
public static void ChromaKeyAlphaBlit(Texture2D input, RenderTexture output, Color color, float
range, float hueRange, float opacity , float edgeSharpness, Vector2 shift, Vector2 multiplier,
bool flipH, bool flipV, Vector4 crop)
{
    Material mat = alphaMat;
    SetShiftAndMultiplier(mat, shift, multiplier, flipH, flipV);
    mat.SetColor("_CKCol", color);
    mat.SetFloat("_Range", range);
    mat.SetFloat("_HueRange", hueRange);
    mat.SetFloat("_Opacity", opacity);
    mat.SetFloat("_EdgeSharp", edgeSharpness);
    mat.SetVector("_Crop", crop);
    Graphics.Blit(input,output,mat);
}
public static void SetShiftAndMultiplier(Material mat, Vector2 shift, Vector2 multiplier,
bool flipH, bool flipV)
{
    if (flipH)
    {
        mat.SetFloat("_uvDefX",1.0f + shift.x);
        mat.SetFloat("_uvCoefX",-1.0f / multiplier.x);
    }
    else
    {
        mat.SetFloat("_uvDefX",0.0f - shift.x);
        mat.SetFloat("_uvCoefX",1.0f / multiplier.x);
    }
    if (flipV)
    {
        mat.SetFloat("_uvDefY",1.0f + shift.y);
        mat.SetFloat("_uvCoefY",-1.0f / multiplier.y);
    }
    else
    {
        mat.SetFloat("_uvDefY",0.0f - shift.y);
```

FIG.2A

```
        mat.SetFloat("_uvCoefY",1.0f / multiplier.y);
      }
  }
    public void SetTexture()
    {
      if (webCamTexture != null && webCamTexture.isPlaying)
      {
        webCamTexture.Stop();
      }
      if (webCamTexture != null)
        webCamTexture.deviceName = devName;
      else
        webCamTexture = new WebCamTexture(devName);
      webCamTexture.Play();
    }
    void OnRenderImage (RenderTexture sourceTexture, RenderTexture destTexture) // sourceTexture
is the source texture, destTexture is the final image that gets to the screen
    {
      switch (srcType)
      {
      case ChromaKeySource.Device:
        Shader.SetGlobalTexture("_UChromaKeyTex", webCamTexture);
        break;
      case ChromaKeySource.Texture:
        Shader.SetGlobalTexture("_UChromaKeyTex", chromaKeyTexture);
        break;
      }
      Shader.SetGlobalVector("_Crop",crop);
      if (flipHorizontal)
      {
        Shader.SetGlobalFloat("_uvDefX",1.0f + uvShift.x);
        Shader.SetGlobalFloat("_uvCoefX",-1.0f / uvCoef.x);
      }
      else
      {
        Shader.SetGlobalFloat("_uvDefX",0.0f - uvShift.x);
        Shader.SetGlobalFloat("_uvCoefX",1.0f / uvCoef.x);
      }
      if (flipVertical)
      {
        Shader.SetGlobalFloat("_uvDefY",1.0f + uvShift.y);
```

FIG.2B

```
        Shader.SetGlobalFloat("_uvCoefY",-1.0f / uvCoef.y);
    }
    else
    {
        Shader.SetGlobalFloat("_uvDefY",0.0f - uvShift.y);
        Shader.SetGlobalFloat("_uvCoefY",1.0f / uvCoef.y);
    }
    if (imageEffect)
    {
        material.SetColor("_PatCol",SelectedColor);
        if (threeColors)
        {
            material.SetColor("_PatCol2",SelectedColor2);
            material.SetColor("_PatCol3",SelectedColor3);
        }
        material.SetFloat("_Range", Range);
        if (!shaderModel2)
            material.SetFloat("_HueRange", HueRange);
        material.SetFloat("_opacity",opacity);
        material.SetFloat("_smoothing",edgeSharpness);
        RenderTexture tempRT =
RenderTexture.GetTemporary(sourceTexture.width,sourceTexture.height,0);
        Graphics.Blit(sourceTexture,tempRT,curMaterial);
        Graphics.Blit(tempRT,destTexture);
        RenderTexture.ReleaseTemporary(tempRT);
        //Graphics.Blit(sourceTexture, destTexture, curMaterial);
    }
    else
{
        Graphics.Blit(sourceTexture,destTexture);
    }
  }
//    Use this for initialization
   void Start () {
     if(!SystemInfo.supportsImageEffects)
     {
        enabled = false;
        return;
     }
     devicesExist = true;
     WebCamDevice[] devices = WebCamTexture.devices;
```

FIG.2C

```
        if (devices.Length == 0)
            devicesExist = false;
        if (SourceType == ChromaKeySource.Device && autoSetDevice && devicesExist)
        {
            DeviceName = devices[0].name;
        }
    }
    void Update ()
    {
        switch (srcType)
        {
        case ChromaKeySource.Device:
            Shader.SetGlobalTexture("_UChromaKeyTex", webCamTexture);
            break;
        case ChromaKeySource.Texture:
            Shader.SetGlobalTexture("_UChromaKeyTex", chromaKeyTexture);
            break;
        }
        Shader.SetGlobalVector("_Crop",crop);
        if (flipHorizontal)
        {
            Shader.SetGlobalFloat("_uvDefX",1.0f + uvShift.x);
            Shader.SetGlobalFloat("_uvCoefX",-1.0f / uvCoef.x);
        }
        else
        {
            Shader.SetGlobalFloat("_uvDefX",0.0f - uvShift.x);
            Shader.SetGlobalFloat("_uvCoefX",1.0f / uvCoef.x);
        }
        if (flipVertical)
        {
            Shader.SetGlobalFloat("_uvDefY",1.0f + uvShift.y);
            Shader.SetGlobalFloat("_uvCoefY",-1.0f / uvCoef.y);
        }
        else
        {
            Shader.SetGlobalFloat("_uvDefY",0.0f - uvShift.y);
            Shader.SetGlobalFloat("_uvCoefY",1.0f / uvCoef.y);
        }
    }
```

FIG.2D

APPARATUS, SYSTEM, AND METHOD OF PROVIDING A THREE DIMENSIONAL VIRTUAL LOCAL PRESENCE

CROSS-REFERENCE TO RELATED APPLICATIONS

This application is a Continuation Application of U.S. application Ser. No. 16/924,323, entitled: APPARATUS, SYSTEM, AND METHOD OF PROVIDING A THREE DIMENSIONAL VIRTUAL LOCAL PRESENCE, filed on Jul. 9, 2020, which claims priority to U.S. Provisional Application Ser. No. 62/872,035, entitled APPARATUS, SYSTEM, AND METHOD OF PROVIDING A THREE DIMENSIONAL VIRTUAL LOCAL PRESENCE, filed on Jul. 9, 2019.

BACKGROUND

Field of the Disclosure

The disclosure relates generally to virtual reality, and, more particularly, to an apparatus, system, and method of providing a three dimensional virtual local presence.

Background of the Disclosure

Alternative, or virtual, technologies have been one of the fastest developing entertainment technologies of the last decade. However, notwithstanding the substantial developments made in this arena, the technology still is very lacking in entertainment value in numerous respects.

Chief among the limitations on so-called "VR" technologies in the current art is the need for "pre-packaging" of the content to be presented to the user. That is, the content presented to the user for virtual reality must be prepared in advance, inclusive of a background and a subject to allow the user to move through and/or view a virtual realm.

Moreover, the aforementioned limitations on prepackaging of content also leads to limitations regarding the hardware on which the content may be presented. More specifically, the need to prepackage the content necessitates that the prepackaging of the data for presentation be formatted well in advance for presentation on particular hardware. As such, there is no availability in the known art to present virtual reality "on the fly" across numerous different hardware platforms.

Therefore, the need exists for an apparatus, system, and method of providing a three dimensional virtual local presence without the need to pre-package the presented data, such as by use of a green screen.

SUMMARY

A virtual local presence display apparatus, system and method is disclosed. Included are an extraction engine capable of automatically disassociating the virtual local presence from its production background; a first data feed of an actual background in which the displaying device resides; a background data feed of a plurality of optional backgrounds including at least the production background of the virtual local presence; a stream subject data feed of an extracted one of the virtual local presence extracted from the production background; an integrated data feed in which the virtual local presence and a background are integrated; a first processing having a receiver capable of receiving the data feeds and assessing a plurality of focal lengths to focal planes for the virtual presence in the production background, and in a selected one of the other backgrounds; and a second processing for causing displaying, on the display device, the virtual presence at a suitable location with regard to the focal planes in a selected one of the other backgrounds.

BRIEF DESCRIPTION OF THE DRAWINGS

The disclosure is illustrated by way of example and not limitation in the accompanying drawings, in which like references may indicate similar elements, and in which:

FIG. 2A is an illustration of aspects of the embodiments;
FIG. 2B is an illustration of aspects of embodiments;
FIG. 2C is an illustration of aspects of embodiments;
FIG. 2D is an illustration of aspects of embodiments.

DETAILED DESCRIPTION

Figure 1:
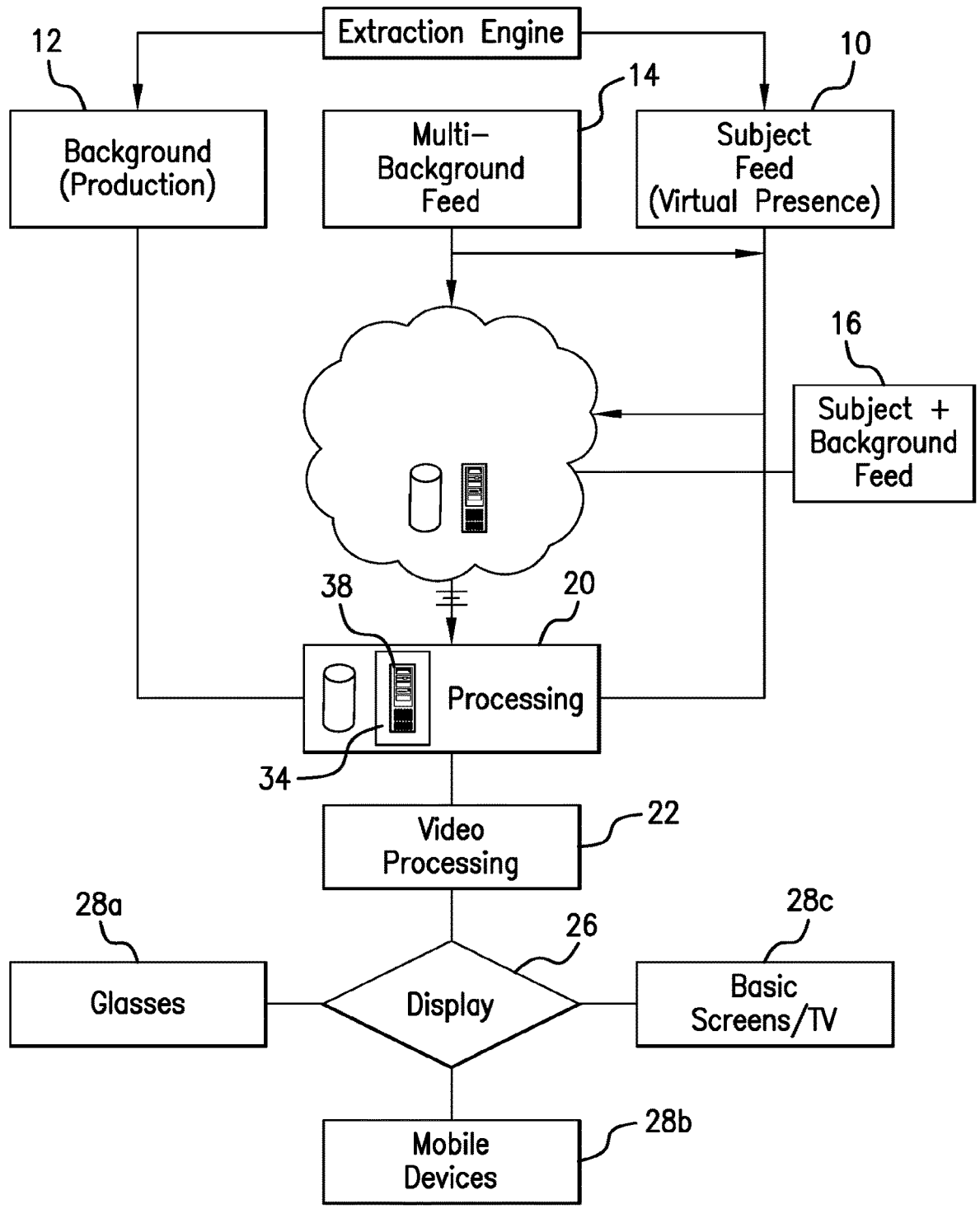
FIG. 1 is an illustration of an aspect of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform, transceive and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

The embodiments provide augmented reality presence capabilities, in which humans, objects, existing media content, and living creatures may be live streamed across multiple hardware platforms independently from a background (of either the produced content data or of the presentation environment). That is, a background content data feed may be provided across multiple platforms separately from the "stream subject" content, or no background content may be provided to an augmented reality hardware platform; rather, the stream subject may be provided on the hardware platform as a two- or three-dimensional "presence" within the three-dimensional real-time background environmental setting in which the user finds the presence disassociated from the content production background.

The embodiments may provide "presence" utilizing various algorithmic techniques that remove the background in which the stream subject is actually presented, and by rendering the stream subject to an augmented reality device, i.e., VR glasses or a cellphone, separately from the presentation of a background on that device. That is, the background in which the stream subject is presented may be provided separately from the stream subject, or may be the user's actual background in the actual world at the local site. The aforementioned algorithms may be based principally in assessment of various focal planes, both in the production and in the presentation environments, as discussed below.

More specifically, the aforementioned techniques may include a chroma key disassociation of the stream subject from the stream subject background, or a live segmentation of the stream subject, in which the stream subject is segmented from a data feed in real-time for presentation on the user's augmented reality device. The latter live segmentation methodology may include machine learning that progressively enables the segmentation of stream subjects from existing backgrounds in a variety of background and data set (i.e., theatrical movies, live sports, etc.) settings.

FIG. 1 illustrates an exemplary embodiment of the disclosure. As illustrated, the embodiments may be thick or thin client, that is, the data feeds referenced throughout may be processed off-device for streaming and display on-device, or may be completely or partially processed on-device for presentation on-device.

As shown, at least four data feeds 10, 12, 14, 16, or streams, may be provided to the disclosed processing. This data may include, by way of example, the actual background in which the presentation device resides 12, a background data feed for presentation on the device 14, a stream subject data feed for presentation on the device 10, and/or a data feed in which the subject and a background are integrated when provided to the processing 16. Upon receipt of one or more of these distinct data feeds (noting that the current background may be actual, but is nevertheless herein referenced as a "data feed"), the base processing 20 may perform numerous of the algorithms described herein. That is, the base processing 20 may assess focal lengths and/or focal planes, may assess colors, such as for removal or blocking of those colors, may assess the characteristics of the stream subject to allow for tracking of that subject for segmentation from a feed, and the like.

As is further illustrated in FIG. 1, following performance of base processing 20, video processing 22 for presentation on a device 24 may be performed by at least one video processor 22. That is, video processing 22 may be used to create the full presentation provided to the displaying device, and/or may modify or vary the video presentation/display 26 as needed based upon the operating platform of the presenting device 28a, b, c, and so on. Upon completion of the video processing, the presence presentation may be made on the subject augmented reality device. Such augmented reality devices may include, by way of non-limiting example, augmented reality glasses, basic video screens, such as televisions or computer screens, and/or mobile devices, by way of non-limiting example.

By way of example, in the event a user wishes to watch a soccer game played in Manchester, England in his front yard, the players, soccer ball, goals, and/or lined playing field might be overlaid in the user's front yard as viewed by the user through virtual reality glasses. Additionally and alternatively, the entire stadium may also be displayed, such as in a movie theater screen format, in the user's front yard on the VR glasses.

Similarly and also by way of nonlimiting example, a user might wish to purchase a large-screen TV, and to do so might hold her mobile device camera up into the corner of her living room where she wishes the television to be placed. The television, which is not actually present, may then be presented at its actual size and in its prospective location in her living room on her mobile device's camera display.

As referenced above, a chroma key technology may be applied to any presentation data feed received in the embodiment of FIG. 1 by the base processing, such as in order to remove any aspect of the received data feed. More particularly, and by way of nonlimiting example, FIG. 2 provides illustrative code that may be employed to remove any color or colors from a video stream in real-time.

In the known art, a disassociated subject of a video may be provided through the use of a "green screen". The base processing provided herein, such as the executable code provided in FIG. 2, allow for the providing of a virtual, rather than an actual, green screen, and hence are much more efficient and require substantially less equipment than does the known art. That is, as a feed is received or rendered, any color or colors, shapes, focal plane locations, focal points, or the like, may be removed from the video as it is rendered to and by the processing.

In a secondary embodiment referenced solely by way of nonlimiting example, the base processing (or the video processing) may live segment a received data feed to extract the desired stream subject for presentation on the device referenced in FIG. 1. Of note, the video feed subjected to such live segmentation may be either prerecorded or a live stream.

More specifically, machine learning 34 within processing 20 may be employed in application to multiple different types of videos in order to detect various desired stream subjects, to the extent those data feeds 10, 12, 14, 16 don't already delineate the stream subject from the stream background. Machine learning 34 may include a base coding that is then applied to relevant data sets in order to "learn" how to detect items, backgrounds, and focal planes in moving pictures. For example, a cloud and/or batch process may be triggered to create and educate prospective models based on stored videos, and such as in formats ready for use on iOS, Android, standard, and any other devices.

Thereafter, code or images may be hierarchically categorized by processing 20, such as into a limited number of available categories such as background, focal planes, moving stream subjects, stationary screen subjects, and so on. Thereby, the disclosed subject recognition models 34 may engage in more refined processing, such as processing a stream subject to a particular format or a particular display definition.

By way of further example in the execution, after generating enough images in each product to create a viable product-specific object recognition model, a training algorithm may be run to create, for example, both a CoreML (iPhone) and Python compatible model. The Python compatible model may then be used primarily for testing against previous iterations to determine how to proceed with generating new models.

Simply put, a preliminary set of detection rules may be provided to the disclosed processing. These preliminary detection rules would include, by way of example, coding related to and indicative of particular characteristics of a desired stream subject. By way of nonlimiting example, for a human stream subject such characteristics might include ranges on typical human heights, widths, color variations, rates of motion (such as may vary as between different sporting events and theatrical movies, by way of example), and the like.

These preliminary rules may then be applied to a predetermined plurality of subject videos in order that the machine learning may improve its stream subject segmentation capabilities. Once these segmentation capabilities reach a predetermined statistical success threshold, the segmentation rule set may "go live". However, in particular embodiments, a feedback path may be provided to a live run that enables a continuous machine learning to continually improve the applied rules based on coded device feedback, user feedback, administrator feedback, advertiser feedback, or the like.

Accordingly, the embodiments enable extraction of a stream subject in a video for presentation of at least that stream subject, embedded with or distinct from the stream subject's original background, on an augmented reality or a standard device. As such, the foregoing methodologies remedy the substantial impracticality of known green screen methods. They further allow for separation of the background from the stream subject, such that the background may also be distinctly used/rendered from the stream subject in the system provided in FIG. 1, by way of example.

It will be apparent to the skilled artisan, in light of the discussion herein, the manner of execution of the disclosed embodiments. By way of example, the initial parameters referenced for machine learning may be provided based on the presentation source, the receiving user, and so on. By way of example, a content provider may indicate what that content provider wishes to be segmented out from its initial background, and/or what aspects of an initial background or stream subject the content provider wishes to be included in the ultimately displayed video. For example, a content provider selling television sets that wishes a user to be able to present those television sets in her own living room may indicate that the television set and the television set alone is to be segmented from the content provided by the content provider. However, Major League Baseball may indicate that they wish, for a center field viewing data feed, that the umpire, the catcher, the batter, the bat, home plate, the pitcher, the ball, the pitcher's mound, and second base be segmented from its data feed, such that all of those aspects of a baseball game may be presented to a viewing user on a display device using the background of that user's actual environment.

In light of the foregoing, the ability to segment certain stream subjects may be a result of the quality of the data feed received. That is, a golf ball in flight may be a relatively small number of pixels in a video feed on a frame by frame analysis basis of that video feed, and, as such, the capability to extract that golf ball from its base video feed may be at least partially dependent on the quality of the video feed received. In short, and as will be appreciated by the skilled artisan, the higher the resolution of a provided video feed, the lower the pixilation from that feed will be, and the more simplistic will be the segmentation of smaller discrete aspects from that base video feed.

Additionally, the video quality also allows improved association of a segmented stream subject with an actual background or a separate background feed. Simply put, a higher quality video feed, such as a 4K video feed, presents more refined pixels, and more numerous pixels than a lower quality video feed, such as a 2K video feed. Consequently, the pixilation of a segmented stream subject, including particularly at the edges of the extracted stream subject, may be more negligible in a higher quality video than a lower quality video upon segmentation of the stream subject, and placement of that stream subject into the desired background display. It goes without saying that, particularly at the edges of an extracted stream subject presented to the user, the video processing referenced in figure one may include smoothing techniques that allow for debarring and demissed colorization, particularly at the edges of the presentation of the stream subject.

Moreover, presentation of videos a different types may likewise be dependent upon the quality of an underlying video feed. By way of example, underlying video of high resolution may allow for presentation of a segmented stream subject using three-dimensional effects. Of course, such 3D effects are highly dependent on the algorithmic focal plane analysis performed by the processing and discussed herein below.

More particularly, and in an exemplary embodiment, a live video stream may be processed by the disclosed processing 20 in FIG. 1 on a frame by frame basis. Each frame may be analyzed based on a series of focal planes and/or multi-point focal points within the stream, such as with particularity relative to the desired stream subject. Accordingly, once the stream subject is segmented from the body of the video stream, the frame by frame focal plane analysis enables an overlay onto focal planes and/or multi-point focal points of any background.

Thereby, the background onto which the segmented stream subject is to be overlaid, such as a background of a room having walls viewed through VR glasses, may include a similar focal plane analysis of the presentation background. Needless to say, a focal plane overlay allows for background objects in the foreground of a presentation to be placed in front of a displayed stream subject, and background objects that should be presented behind the stream subject to be displayed properly behind the stream subject.

Needless to say, a weighting algorithm 38 may also be employed in circumstances where background focal planes in the ultimate presentation to a user are of substantially different distances, i.e., are much closer or much farther away, than the available focal planes in the initial background from which the stream subject was taken, which initial background was initially subjected to a focal plane analysis. That is, a multi-point, multi-planar analysis 38 of both a produced content background and an ultimate presentation may cause the focal planes in the ultimate presentation to receive a progressively increasing weight of actual distance (to account for perspective) of 7× in the foreground, 4.5× in the midground, and 3.2 in the background as compared to the same respective background planes in the produced content. Of course, this allows for the stream subjects to be presented on a much different background, such as wherein a professional soccer game is presented in a small living room, without distortion of the proper size or sizes of the stream subjects presented in the differing backgrounds as between the presentation environment and the content production environment.

Moreover, and as referenced above, the embodiments thereby enable, for example, a person 100 walking in a theatrical release to walk across a user's living room, and be presented as walking on the user's living room floor (rather than floating in the air), and similarly walking behind the user's coffee table in the foreground of the viewed display (based on the viewer's distance from the character walking), such that the theatrical subject's feet disappear behind the coffee table, based on the focal plane 102 presented by the actual coffee table in the user's living room (i.e., the actual background). Similarly, the focal plane analysis 38 allows for the maintenance of proper relative sizes 100a of the stream subject 100 in relation to the viewer from any focal plane 102 in the background of the user's field of view. That is, "life-sized" stream subject 100 content may be properly estimated and readily rendered into an actual environment background based on an overlay of the available focal planes 102a, 102b, . . . in each setting, i.e., in the initial content production setting from which the stream subject was segmented, and in the ultimate presentation setting, in which the new background may be the user's living room, for example.

Figure 3:
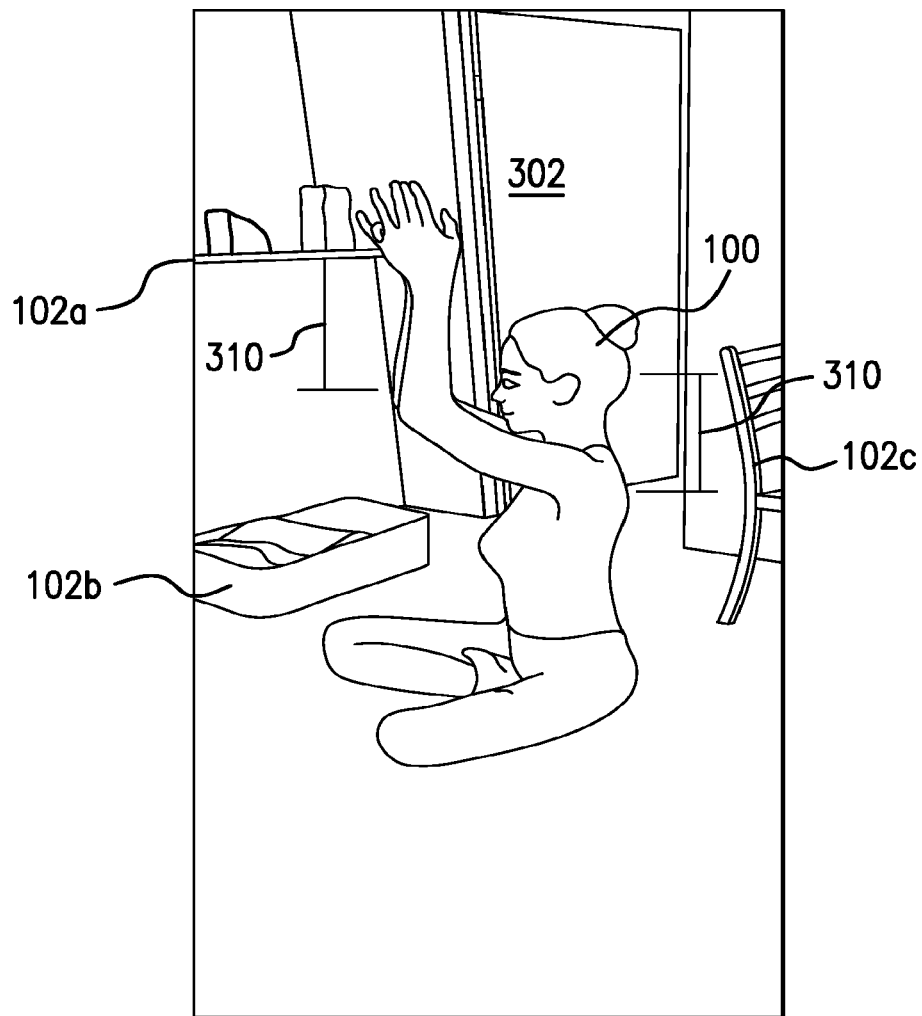
FIG. 3 is an illustration of an aspect of the embodiments.

FIG. 3 illustrates the selection of focal planes 102a, 102b, . . . in a produced video to be segmented into an ultimate presentation background 302. Of note, the presentation background 302 may be, for example, a real world setting such as may be viewed through VR glasses, or may be a background selected from a different media, such as a video different from the one which the segmented stream subject is taken.

As illustrated, any flat surface within a view field, such as within the view field of a mobile device, or VR glasses, presents at least one potential plane 102a, b, . . . from which to assess a focal plane overlay 310. By way of example, in a professional soccer game the goal may present a focal plane, as may an advertisement placed on a stadium wall behind the goal; and in a living room, a table, chairback, floor, ceiling, or lampshade may likewise serve as a focal plane.

Consequently, subject to the assessment of one or more focal planes 102a, b, . . . suitable to engage in the disclosed overlay 310, a stream subject 100 or subjects may be placed anywhere at any distance onto or in association with a plane or focal point 102a, b, . . . in the presentation display 26 referenced in FIG. 1. That is, the stream subject may be placed anywhere relative to any 3D plane in a background of the presentation display.

As may be appreciated, relative distances as between a background and a user may be manually or automatically selected in the embodiments. For example, a user may tap an area in a cell phone camera view at which a stream subject is to be displayed, and/or may elect for the stream subject to be life-size, or "stadium size" (i.e., a soccer player of a similar size to that the user would view if the user were in stadium seating in a stadium watching a soccer game). The processing of the embodiments performs this by assessing flat or substantially flat surfaces within each of the original production presentation and the user presentation backgrounds, and maintains that plane or those planes as a reference to allow for the selected presentation of the stream subject. Not only does this allow for manual selection of a presentation, but also allows for a maintenance of perspective of the presentation—that is, as a viewer may walk closer to or away from a stream subject, the perspective and sizing of the stream subject may variably change dependent upon the presentation. In the foregoing example, a life-size soccer player might have a perceptible change in size as a user walked from 25 feet away from that soccer player to three feet away from that soccer player. However, in a stadium view setting, the user walking 25 feet closer to the soccer player stream subject would have very little effect on the presented size of the soccer player stream subject.

Moreover, and as referenced above, the user may change perspective of the stream subject as the user moves about. Thereby, the disclosed processing and/or video processing may engage in an analysis of multiple views of the stream subject throughout the base video, such that the processing can extrapolate the appearance of the stream subject from different angles, or the processing may simply take each frame by frame flat view and extrapolate that view into an appearance from multiple angles.

Yet further, a subject may be produced in 3D to enable a multi-perspective presence view, whether or not the initial production was formally in 3D. For example, 3D cameras 1510 may capture a stereo video with the subject in any environment. Using segmentation aspect 1512, the subject may then be removed frame by frame from the production environment, and the production environment replaced with a digital green screen.

Figure 10:
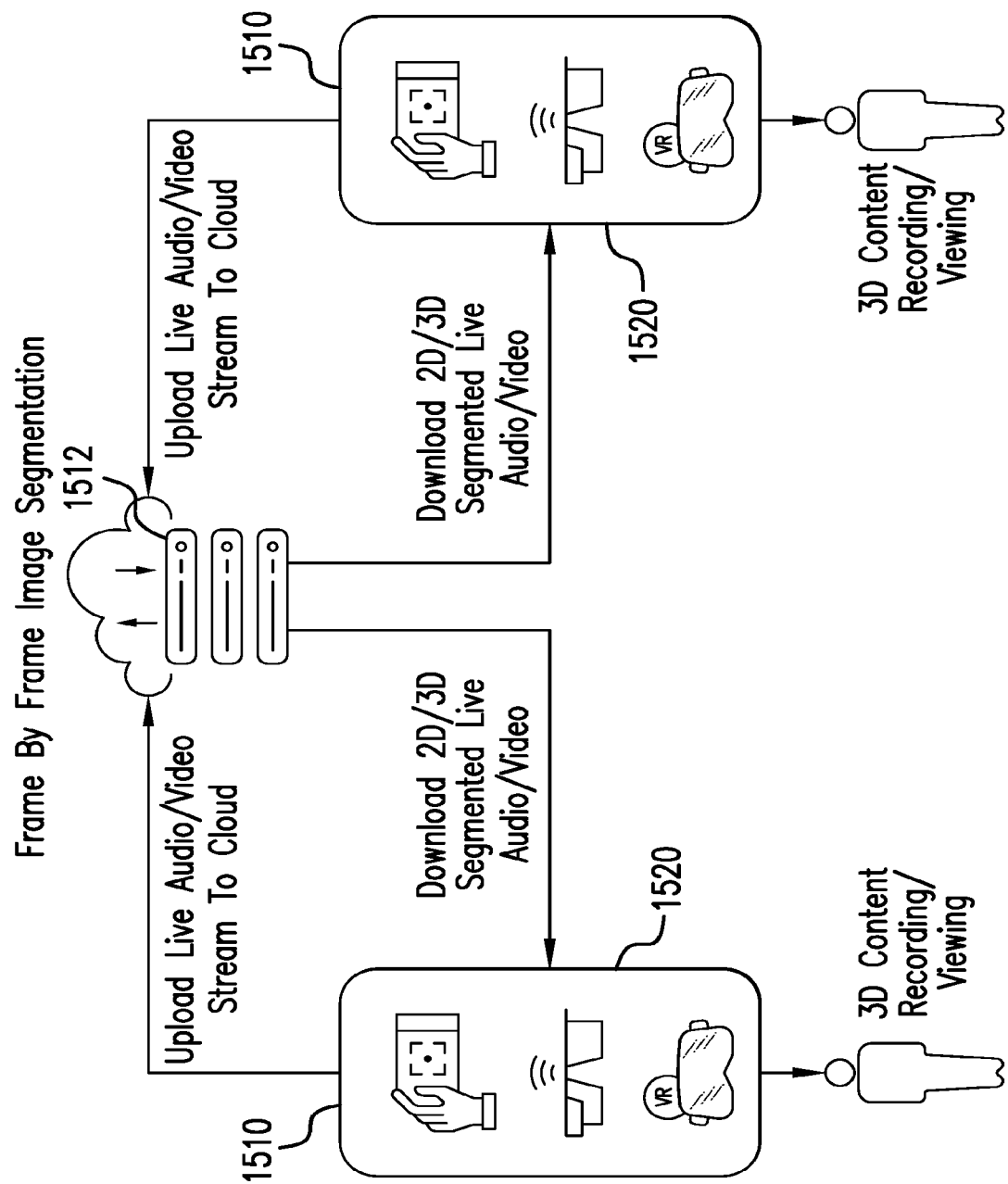
FIG. 10 illustrates aspects of the embodiments.

Alternatively, using two cameras 1510, such as the two back cameras of a smartphone, a "stereo" 3D video may be created with the subject in any environment. As above, using segmentation 1512 the subject may be removed frame by frame from the production environment, such as via a virtual/digital green screen. This is illustrated in the embodiment of FIG. 10.

The frame by frame processing for 3D may use two different strategies. The first may use a convolutional neural network to detect the subject in each frame, and to then remove the background from the video around the subject, frame by frame (semantic segmentation at the pixel level). This technique may be trained by using a dataset of images with persons shown therein; following detection of the person, a filter is applied replacing with a green pixel all pixels not corresponding to the person.

The second method may use the 3D cameras or smart phones with dual cameras and other sensors to combine both recordings to allow for calculation of the relative distance of objects by creating a depth map for each video frame, i.e., through the use of the focal plane analysis discussed throughout. In this method, a mask is created for each video frame, and each pixel will or will not be filtered depending on the corresponding mask. Pixels that don't correspond to the mask will be replaced with a green pixel.

Upon receipt at presentation device 1520, the green background may be removed frame by frame, such as with a live chroma key, in real time, at runtime. In order to achieve this, a shader may be employed, such as based on the ultimate presentation device. Shaders may remove the green background and replace it with a transparent background. This may be accomplished by: receiving a key color to extract from the image; receive a threshold for the color to be removed from the video (the higher the value, the more colored pixels are considered in the chroma-keying); and by receiving a slope, which smooths the threshold to soften the effect of the color removal. Additionally and alternatively, the shader may operate for a VR/AR headset to either: create a new frame for each camera by cropping the bottom and top parts from the video stream and delivering it to the left and right screens; or create a new frame for each camera by cropping the left and right parts from the video stream and delivering it to the left and right screens.

Figure 11:
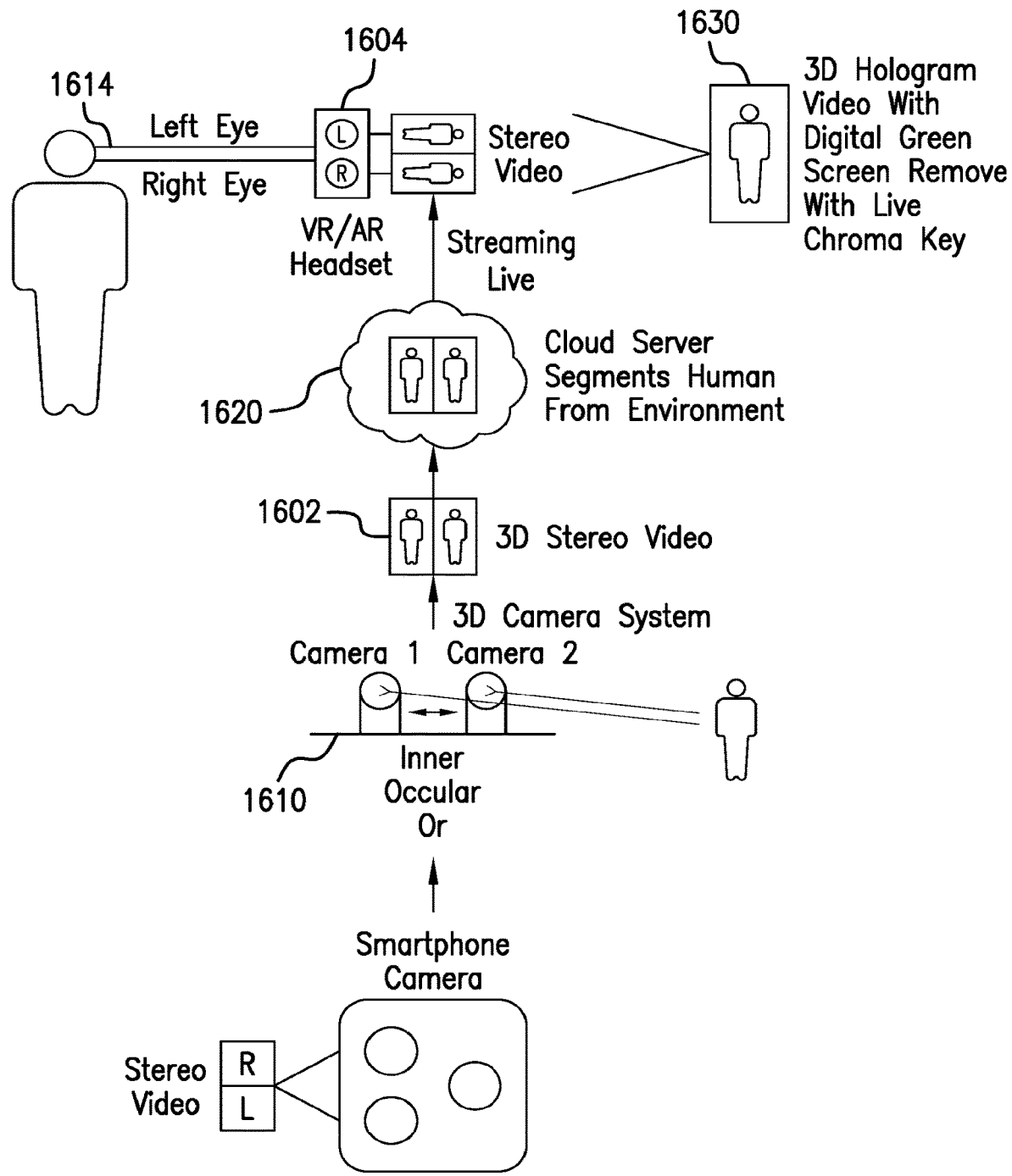
FIG. 11 illustrates aspects of the embodiments.

FIG. 11 illustrates that a 3D live video feed is recorded or streamed in real time 1602 into an Augmented Reality (AR)/Virtual Reality (VR)/Mixed Reality (XR) headset or other presentation device 1604. By projecting two camera feeds 1610 from, for example, a 3D camera system into the left and right "eye" 1614 of the VR/AR headset, different content is delivered to each eye thus creating a 3D hologram 1630. Additionally, a machine learning technique is applied to the video stream by removing each frame of background from the subject 1620, and replacing the background environment with, for example, a digital green screen. The final 3D stereo video (over/under or left/right) is run to remove the digital green screen, leaving only a three dimensional human being, animal or object for presentation 1614. Both live broadcasts and previously recorded videos can be thus consumed and rendered. Apart from 3D videos, 2D videos can also be captured and delivered for presentation 1614.

Thus, in accordance with the foregoing, a user may be enabled to manually choose between different displays and/or modes, such as in a provided "app". By way of example, a user might select "television mode", or might select "live mode", for a sporting event. If live mode were selected, the background of the soccer match base video might be segmented out, and only the players, the ball, and the goals presented to the user. On the contrary, if TV mode were selected, a movie theater size television screen might be presented on a background, such as in a user's backyard, wherein the entire soccer match, including the actual soccer match background in the base video, is presented on a "floating" movie screen. Of course, it will be apparent to the skilled artisan that, although the prior disclosure is made with regard to manual selection by an ultimate viewer, the disclosed processing may be capable of automatically selecting such choices, or maintaining user preferences from prior manual selections, by way of example.

Figure 4:
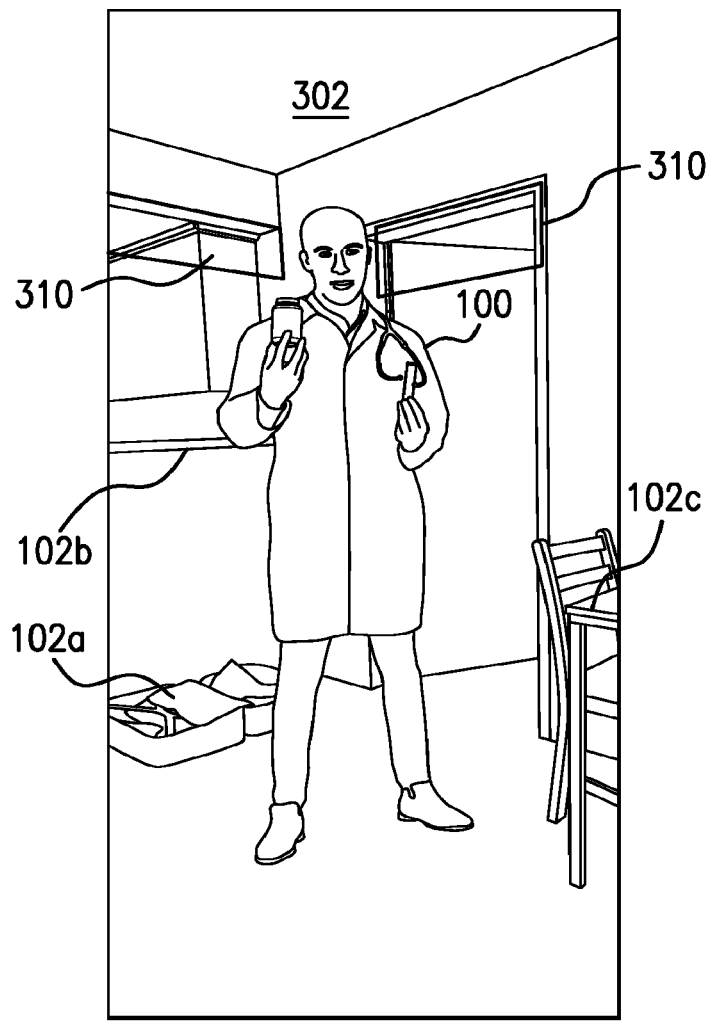
FIG. 4 is an illustration of an aspect of the embodiments.

FIG. 4 illustrates an application of the disclosed embodiments. In the illustration, a stream subject 100 is removed from its initial base video/background, and is presented in a room of a user's house as if the stream subject 100 is in the room. The illustrated presentation may be made, by way of example, on VR glasses. Of note, it appears that the stream subject's feet are in contact with the floor of the user's house, and that objects in the foreground of the presentation, such as a coffee table, provide focal planes/points 102 that will allow for a complete or partial blocking of the stream subject's 100 lower extremities as if the stream subject were standing in the house.

Figure 5:
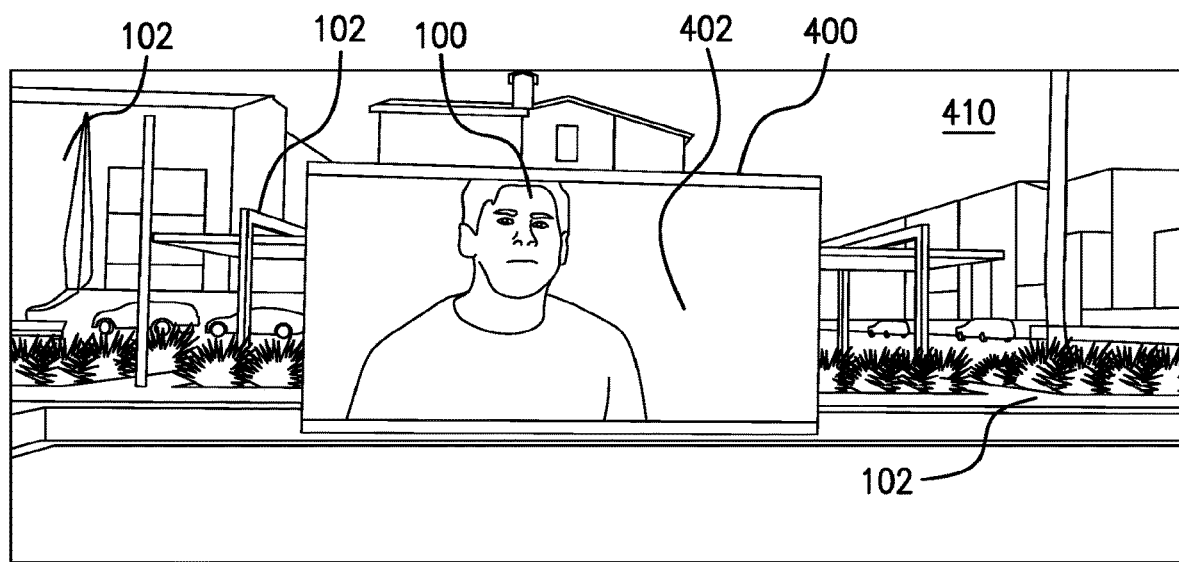
FIG. 5 is an illustration of an aspect of the embodiments.

FIG. 5 illustrates the projection of a full television set 400 into a background of a yard 410. In the illustration, both the segment subjects 100 and the base video background 402 are presented together on a faux background of a television set 400 based on focal planes 102 presented in a user's yard.

Figure 6A:
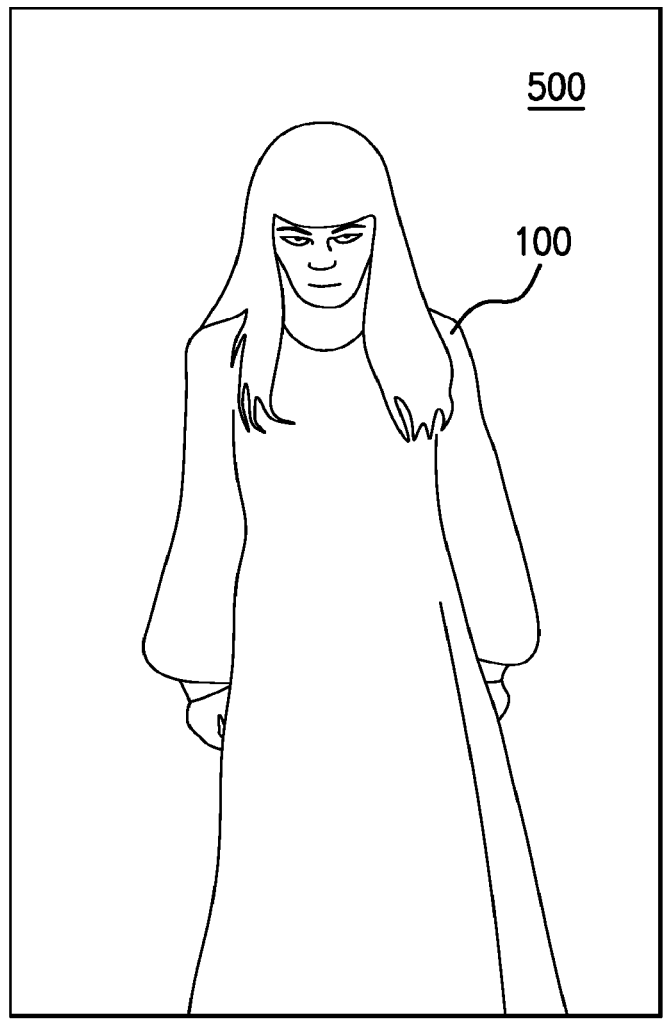
FIG. 6A is an illustration of aspects of the embodiments.
Figure 6B:
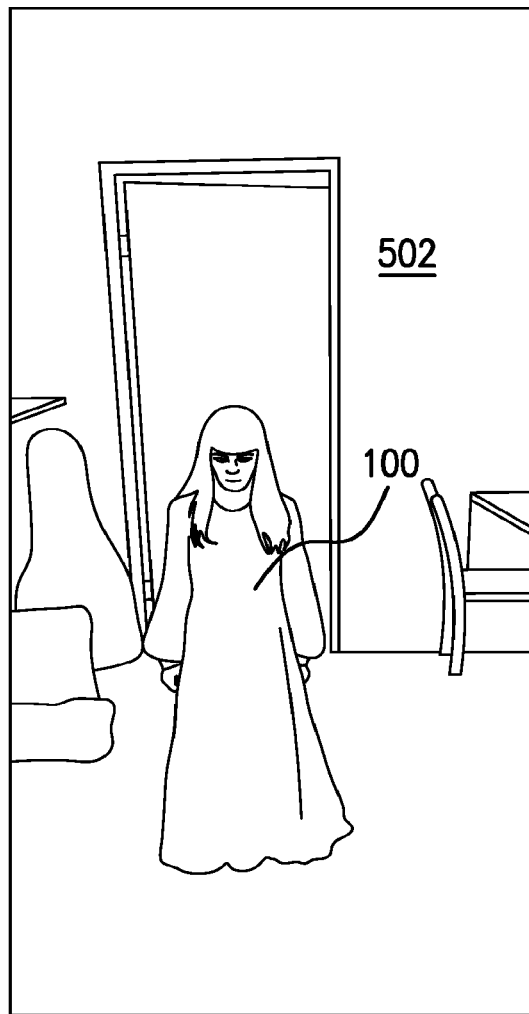
FIG. 6B is an illustration of aspects of the embodiments.

FIGS. 6A and 6B illustrate the removal of a stream subject 100 from a background 500 in an underlying base video (in this case, a theatrically released movie on a DVD) for inclusion in a presentation to a user on a different background 502. As illustrated, the stream subject 100 is segmented from the base video using a focal plane analysis, and overlaid into a room of a user's house based on focal plane analysis of the background presented by the room.

Figure 7:
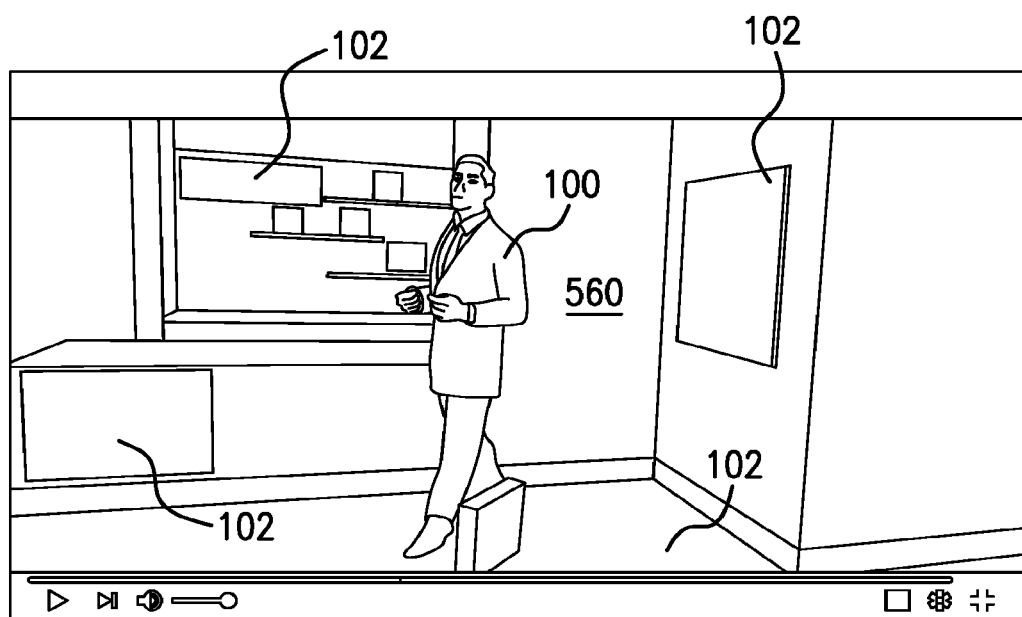
FIG. 7 illustrates aspects of the embodiments.

Various particular applications may be uniquely provided via the embodiments. For example, FIG. 7 illustrates a remote business meeting embodiment. Whether down the street, or across the country, the illustrated subject 100 is effectively presented on the background of the user's living room 560. The subject can show and illustrate everything he wishes, and the use can see the illustration from various angles and in 3D. As such, this embodiment is ideal, for example, for remote marketing demonstrations.

By way of further example, a teledoc appointment may provide a bi-directional, focal plane 102 based 3D presentation of the stream subject to both end users. That is, the patient user may see the doctor 100 in her living room 560, while the doctor may see the patient in her office. Of course, a 3D view of the patient allows the doctor to move around and diagnose the patient remotely in a manner heretofore unknown. This, of course, will allow doctors to treat patients in ways not presently possible, including those patients unable to get to the doctor or to the ER.

Accordingly, the embodiments allow nearly limitless applications. For example, scientific and engineering discussions may be had in which one party is on-site, such as in a laboratory, and another party sees the first party, and parts, chemicals, or the like manipulated by the first party, in the other party's garage, in three dimensions, such as from thousands of miles away. Moreover, the ability to enhance size allows the remote party to "zoom in" and see particular aspects with great specifity, for example.

Similarly, calls with family may now be truly live, in-person, and in three dimensions, such that all parties appear to be truly "present" together. During certain occurrences, such as during a pandemic, this may be the only way that families and friends can truly gather.

FIG. 8 illustrate a pair of fighters as stream subjects 100. These stream subjects are not only shown displayed on the background 902 of a hotel lobby, but additionally are shown using the aforementioned three dimensional estimation and multi-camera visual data from the production site.

Figure 8A:
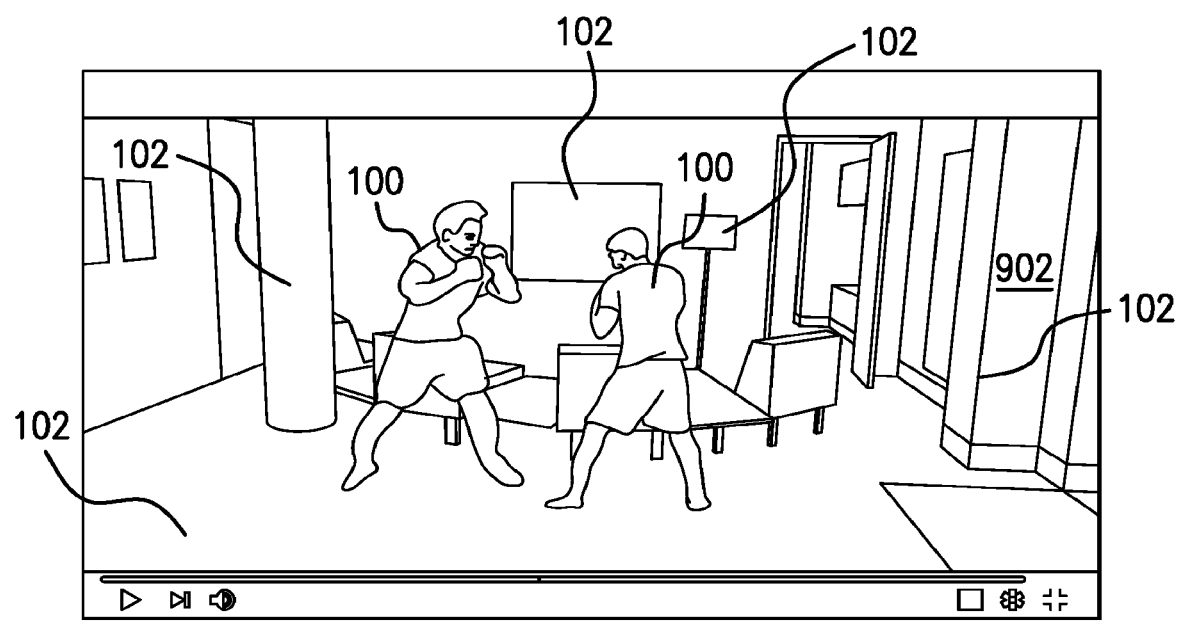
FIG. 8A illustrate aspects of the embodiments.
Figure 8B:
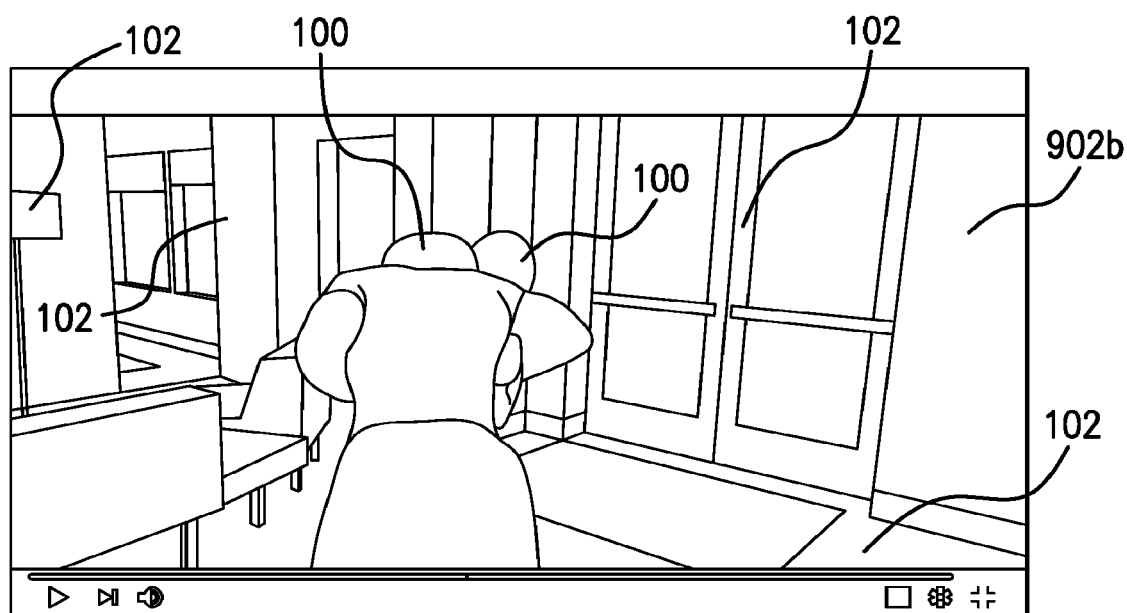
FIG. 8B illustrate aspects of the embodiments.
Figure 8C:
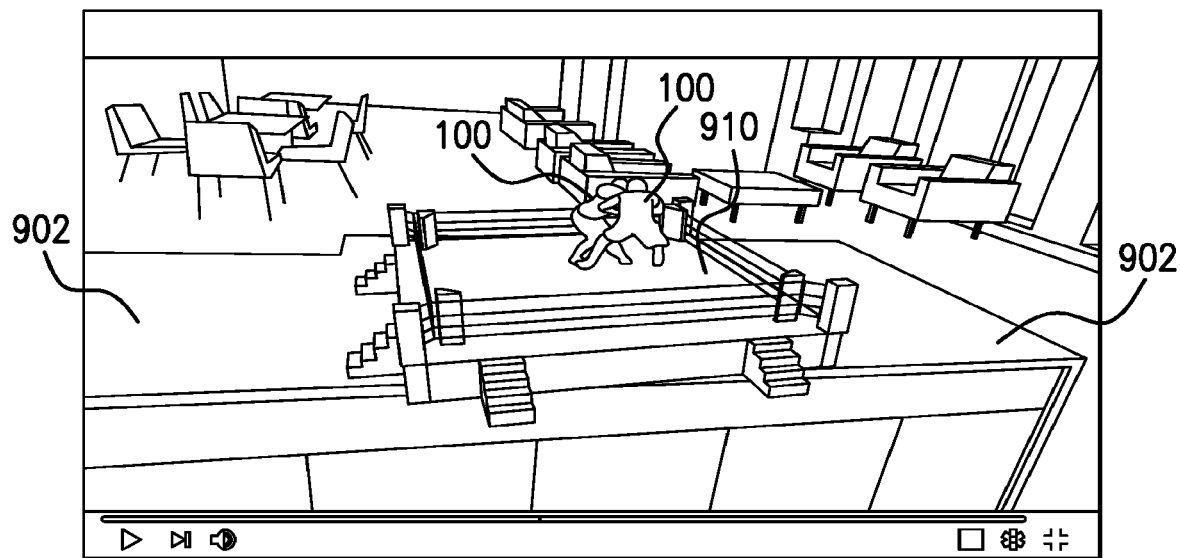
FIG. 8C illustrate aspects of the embodiments.

Accordingly, the stream subjects are automatically "life-sized" as compared to the focal planes 102 assessed in the initial background 902 in FIG. 8A. Thereafter, the user may walk around the fighters 100, to the extent they are "locked" to their focal location in the hotel lobby, and the angles of the fighters will be viewed as three dimensional, against the varying background 902b as the viewer moves about the lobby, as illustrated in FIG. 8B. Finally, the fighters 100 are re-sized, and placed within a virtual "ring" as a primary background 910, to allow for presentation of the fight on a table in the lobby, acting as the presentation background 902, as shown in FIG. 8C.

Figure 9:
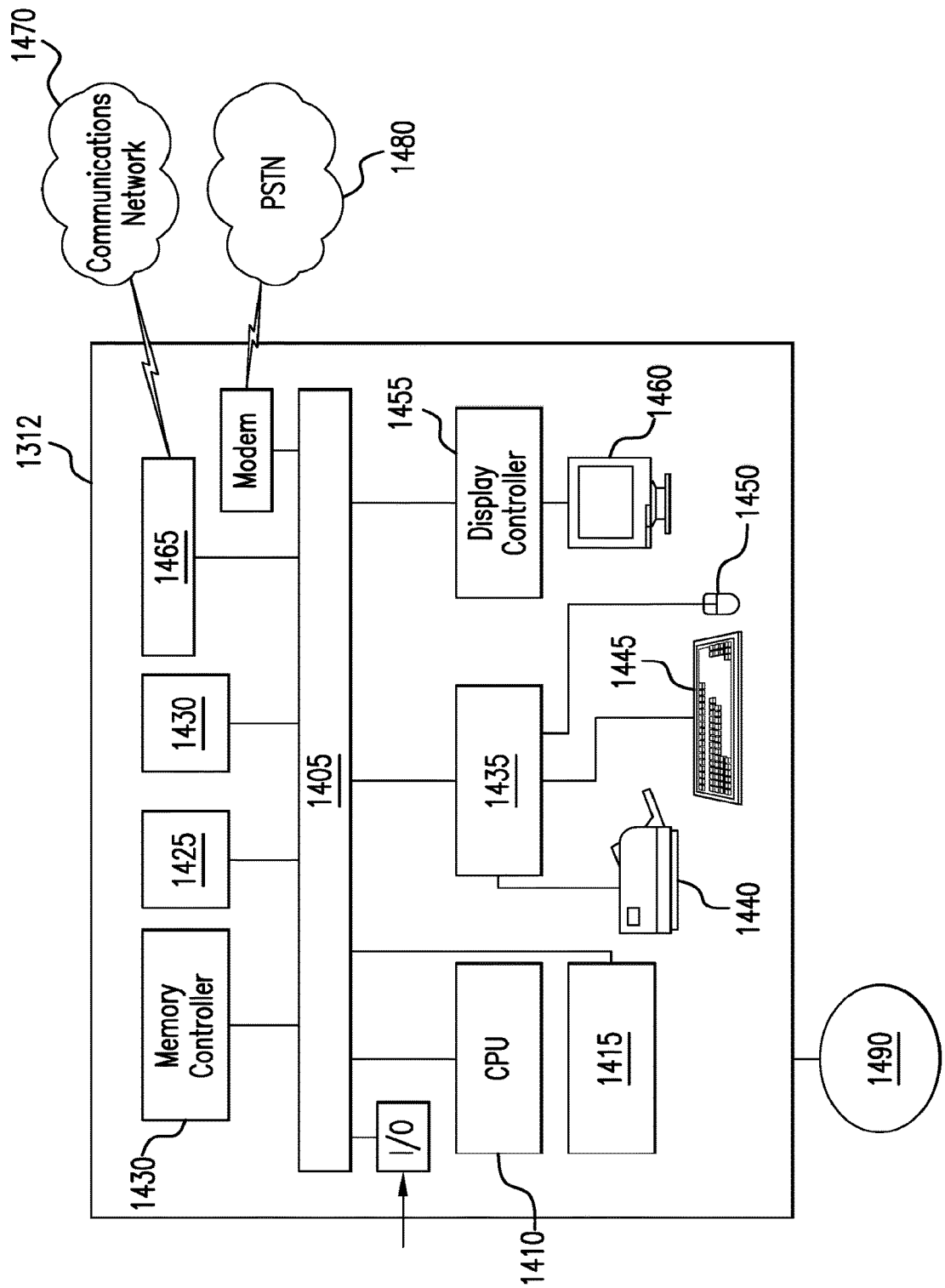
FIG. 9 illustrates aspects of the embodiments.

FIG. 9 depicts an exemplary computer processing system 1312 for use in association with the embodiments, by way of non-limiting example. Processing system 1312 is capable of executing software, such as an operating system (OS), applications, user interface, and/or one or more other computing algorithms/applications 1490, such as the recipes, models, programs and subprograms discussed herein. The operation of exemplary processing system 1312 is controlled primarily by these computer readable instructions/code 1490, such as instructions stored in a computer readable storage medium, such as hard disk drive (HDD) 1415, optical disk (not shown) such as a CD or DVD, solid state drive (not shown) such as a USB "thumb drive," or the like. Such instructions may be executed within central processing unit (CPU) 1410 to cause system 1312 to perform the disclosed operations, comparisons and calculations. In many known computer servers, workstations, personal computers, and the like, CPU 1410 is implemented in an integrated circuit called a processor.

It is appreciated that, although exemplary processing system 1312 is shown to comprise a single CPU 1410, such description is merely illustrative, as processing system 1312 may comprise a plurality of CPUs 1410. Additionally, system 1312 may exploit the resources of remote CPUs (not shown) through communications network 1470 or some other data communications means 1480, and/or local CPUs, as discussed throughout.

In operation, CPU 1410 fetches, decodes, and executes instructions from a computer readable storage medium, such as HDD 1415. Such instructions may be included in software 1490. Information, such as computer instructions and other computer readable data, is transferred between components of system 1312 via the system's main data-transfer path. The main data-transfer path may use a system bus architecture 1405, although other computer architectures (not shown) can be used.

Memory devices coupled to system bus 1405 may include random access memory (RAM) 1425 and/or read only memory (ROM) 1430, by way of example. Such memories include circuitry that allows information to be stored and retrieved. ROMs 1430 generally contain stored data that cannot be modified. Data stored in RAM 1425 can be read or changed by CPU 1410 or other hardware devices. Access to RAM 1425 and/or ROM 1430 may be controlled by memory controller 1420.

In addition, processing system 1312 may contain peripheral communications controller and bus 1435, which is responsible for communicating instructions from CPU 1410 to, and/or receiving data from, peripherals, such as peripherals 1440, 1445, and 1450, which may include printers, keyboards, and/or the operator interaction elements on a mobile device as discussed herein throughout. An example of a peripheral bus is the Peripheral Component Interconnect (PCI) bus that is well known in the pertinent art.

Operator display 1460, which is controlled by display controller 1455, may be used to display visual output and/or presentation data generated by or at the request of processing system 1312, such as responsive to operation of the aforementioned computing programs/applications 1490. Such visual output may include text, graphics, animated graphics, and/or video, for example. Display 1460 may be implemented with a CRT-based video display, an LCD or LED-based display, a gas plasma-based flat-panel display, a touch-panel display, or the like. Display controller 1455 includes electronic components required to generate a video signal that is sent to display 1460.

Further, processing system 1312 may contain network adapter 1465 which may be used to couple to external communication network 1470, which may include or provide access to the Internet, an intranet, an extranet, or the like. Communications network 1470 may provide access for processing system 1312 with means of communicating and transferring software and information electronically. Additionally, communications network 1470 may provide for distributed processing, which involves several computers and the sharing of workloads or cooperative efforts in performing a task, as discussed above. Network adaptor 1465 may communicate to and from network 1470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A display system for a virtual local presence, comprising:
   a display device;
   an extraction engine that automatically disassociates the virtual local presence from a remote production background;
   a first data feed of an actual background in which the display device resides;
   a stream subject feed of the disassociated one of the virtual local presence extracted from the remote production background;
   an integrated data feed in which the stream subject feed, the first data feed, and the remote production background are integrated;
   a first module executed by a processor of the display device for comparing, from the integrated data feed, a plurality of focal lengths to focal planes for the virtual local presence in the remote production background to a plurality of focal lengths in 3 dimensions in the actual background; and
   a second module executed by the processor of the display device for causing displaying on the display device of the virtual local presence at a user-selected perceptible location in the actual background according to an output of the comparing from the first module.

2. The display system of claim 1, wherein the extraction engine is thin client.

3. The display system of claim 1, wherein the first module is thin client.

4. The display system of claim 1, wherein the second module is thin client.

5. The display system of claim 1, wherein the extraction engine further includes assessment, blocking or removal of colors.

6. The display system of claim 1, wherein the first module further includes assessment, blocking or removal of colors.

7. The display system of claim 1, wherein the extraction engine comprises motion tracking of the virtual local presence.

8. The display system of claim 1, wherein the virtual local presence is presented three-dimensionally.

9. The display system of claim 1, wherein the display device is one of augmented reality glasses, a basic video screen, or a mobile device.

10. A display system for locally displaying a virtual presence from a remote event, comprising:
- a display device;
- an extraction engine that automatically disassociates the virtual local presence from a production background at the remote event;
- a first data feed of an actual background in which the display device resides;
- a stream subject feed of the disassociated one of the virtual local presence extracted from the production background;
- an integrated data feed in which the stream subject feed, the first data feed, and the production background are integrated;
- a first module executed by a processor of the display device for comparing, from the integrated data feed, a plurality of focal lengths to focal planes for the virtual local presence at the remote event to a plurality of focal lengths in the actual background; and
- a second module executed by the processor of the display device for causing displaying on the display device of the virtual local presence at a user-selected perceptible location in the actual background according to an output of the comparing from the first module.

11. The display system of claim 10, wherein the extraction engine is thin client.

12. The display system of claim 10, wherein the first module is thin client.

13. The display system of claim 10, wherein the second module is thin client.

14. The display system of claim 10, wherein the extraction engine further includes assessment, blocking or removal of colors.

15. The display system of claim 10, wherein the first module further includes assessment, blocking or removal of colors.

16. The display system of claim 10, wherein the extraction engine comprises motion tracking of the virtual local presence.

17. The display system of claim 10, wherein the virtual local presence is presented three-dimensionally.

18. The display system of claim 10, wherein the display device is one of augmented reality glasses, a basic video screen, or a mobile device.

* * * * *